US009299983B2

(12) United States Patent
Chen et al.

(10) Patent No.: US 9,299,983 B2
(45) Date of Patent: Mar. 29, 2016

(54) SN—SB—NI TERNARY COMPOUND AND METHOD FOR FORMING THE SAME

(75) Inventors: Chih-chi Chen, Tao-Yuan (TW); Yue-ting Chen, Tao-Yuan (TW)

(73) Assignee: CHUNG YUAN CHRISTIAN UNIVERSITY, Tao-Yuan (TW)

( * ) Notice: Subject to any disclaimer, the term of this patent is extended or adjusted under 35 U.S.C. 154(b) by 1131 days.

(21) Appl. No.: 13/336,739

(22) Filed: Dec. 23, 2011

(65) Prior Publication Data

US 2013/0126053 A1  May 23, 2013

(30) Foreign Application Priority Data

Nov. 22, 2011  (TW) .............................. 100142657 A

(51) Int. Cl.
| | |
|---|---|
| B23K 20/02 | (2006.01) |
| B32B 15/01 | (2006.01) |
| B23K 20/00 | (2006.01) |
| B23K 28/00 | (2006.01) |
| H01M 4/38 | (2006.01) |
| C22F 1/00 | (2006.01) |
| B23K 35/26 | (2006.01) |
| B23K 35/00 | (2006.01) |
| C22F 1/16 | (2006.01) |
| B23K 35/28 | (2006.01) |
| C22C 12/00 | (2006.01) |
| B23K 1/00 | (2006.01) |

(Continued)

(52) U.S. Cl.
CPC .............. H01M 4/387 (2013.01); B23K 1/0016 (2013.01); B23K 20/233 (2013.01); B23K 35/004 (2013.01); B23K 35/26 (2013.01); B23K 35/262 (2013.01); B23K 35/28 (2013.01); C22C 12/00 (2013.01); C22F 1/00 (2013.01); C22F 1/16 (2013.01); H01M 4/38 (2013.01); H01M 4/134 (2013.01)

(58) Field of Classification Search
CPC .... H01L 35/18; B23K 35/3033; B23K 31/02; B23K 28/00; C22F 1/00
USPC .............. 252/62.3 T; 228/262.31, 262.3, 194; 228/141.1; 148/528
See application file for complete search history.

(56) References Cited

U.S. PATENT DOCUMENTS 7,800,230 B2 * 9/2010 Hirano et al. .................. 257/772

OTHER PUBLICATIONS

Yue-ting Chen; Chih-chi Chen, "Phase equlibria studies of the Sn—Sb—Ni system at 270°C.," Microsystems Packaging Assembly and Circuits Technology Conference (IMPACT), 2010 5th International , vol., No., pp. 1,4, Oct. 20-22, 2010 doi: 10.1109/IMPACT.2010.5699556.*

(Continued)

*Primary Examiner* — Matthew E Hoban
*Assistant Examiner* — Anthony Liang
(74) *Attorney, Agent, or Firm* — WPAT, PC; Justin King

(57) ABSTRACT

The invention discloses a novel method to prepare the Ni(Sn, Sb)$_3$ skutterudite compound. Skutterudite compounds are thermoelectric materials, which can transform heat into electric energy. Besides, the Ni(Sn, Sb)$_3$ compound is also an anode material of Li ion battery. The solid state diffusion method is used to prepare the Ni(Sn$_{1-x}$, Sb$_x$)$_3$ compound. Compared to traditional physical or chemical processes, the method disclosed in the invention is simpler and operates at a lower temperature. By the method according to the invention, the composition of the Ni(Sn, Sb)$_3$ compound can be adjusted to fulfill variety requirements for different applications. It is noteworthy that the invention can prepare ternary compounds. In comparison with the frequently used binary compounds such as Ni$_3$Sn$_4$ or Cu$_6$Sn$_5$, the invention can produce materials with better performance.

22 Claims, 5 Drawing Sheets

(51) Int. Cl.
*B23K 20/233* (2006.01)
*H01M 4/134* (2010.01)

(56) References Cited

OTHER PUBLICATIONS

Briggs, Ed. "Profiling Basics—Reflow Phases." Web log post. Indium Corporation Blogs. Indium Corporation, Feb. 26, 2010. Web. Jul. 24, 2015.*

"Mixtures of Metals and Melting Points." The Engineering Toolbox. N.p., n.d. Web. Jul. 24, 2015.*

Ronan, David T. "Unsoldering." Practical VCR Repair. New York: Delmar, 1995. 333-335.*

Rowe, David Michael. "Skutterudite-Based Thermoelectrics."Thermoelectrics Handbook: Macro to Nano. Boca Raton: CRC/Taylor & Francis, 2006. 34-1-4-3.*

* cited by examiner

SN—SB—NI TERNARY COMPOUND AND METHOD FOR FORMING THE SAME

BACKGROUND OF THE INVENTION

1. Field of the Invention

The present invention is generally related to a Sn—Sb—Ni ternary compound, and more particularly to a Ni(Sn, Sb)$_3$ skutterudite compound and preparation method thereof.

2. Description of the Prior Art

Soldering is an important bonding method in electronic products and is also an important technique in electronic packaging. Low-temperature solder is used to bond different substrates and elements. When the soldering temperature is higher than the melting point of the solder, the melted solder wets the substrate and reacts with the substrate. Then, the temperature of the solder drops and the solder solidifies to form a soldering joint. The process of the electronic packaging starting from assembling one or more than one integrated chips with a package structure till completing packaging an electronic product includes various soldering processes. In order to prevent the soldering joint in the previous process from being damaged or re-melted, the solder having a higher melting point should be used in the earlier stage of the packaging process and the solder having a lower melting point should be used in the higher level or the later stage of the packaging process. Besides, in order to prevent the solder from directly contacting with the electronic element to damage the electronic element, before the soldering process, under bump metallurgy (UBM) should be deposited on the electronic element.

Since Sn—Pb solder has good wetting and mechanical properties and also does not react with the substrate easily, the Sn—Pb solder has been used in electronic industry for a long time and its processing methods have been well developed. However, since lead (Pb) is hazard to human health and environment, most of electronic products nowadays are lead-free. Recently, development and research on the lead-free solder has been drawn great attention throughout the world and the factors including a proper melting point, high heat dissipation coefficient (<20~30 W/mK), low resistance (<0.0001 Ω·cm), good wetting property with various substrates, being unable to react with substrates vigorously, and low production cost should be considered. The potential and commonly seen solder includes, for example, high temperature solders Au-20 wt % Sn and Sn-5 wt % Sb. Au-20 wt % Sn-5 wt % Sb has been considered having the most potential in the future. The Sn—Sb solder has a disadvantage of having a relatively low melting point but Au—Sn has a high cost problem. Besides, nickel (Ni) has terrible reactivity with solders among known materials but Ni is a commonly used material for a diffusion barrier layer. When a solder is reflowed on UBM, its wetting layer dissolves quickly into the solder to form a soldering joint of Sn—Sb/Ni.

When the solder and the substrate are in contact with each other, elements diffuse and react to form an intermetallic phase because the chemical potential of each element is different from each other. The intermetallic phase having an appropriate thickness can increase the adhesiveness between the solder and the substrate but a thick interface may cause weakness of the mechanical property of the soldering joint to lower the reliability of a product because the intermetallic phase is brittle.

On the other hand, since energy resources of the earth are depleting, renewable green energy sources, such as solar energy, wind power, biomass, etc., become important. Although waste heat recovery is not considered important yet, according to reports from department of energy of the United States, at least 5% of energy will be obtained from waste heat recovery in the United States till 2020. Waste heat recovery is worth further research. Thermoelectric materials can convert thermal energy into electric energy or can be used as a cooler if supplied with electric energy. Compared to a refrigerator, since thermoelectric materials do not need a coolant and can convert waste heat into electric energy, thermoelectric materials are very environmental-friendly. The property of a thermoelectric material is often represented by a dimensionless equation:

$$ZT = (S^2 T\sigma)/\kappa$$

where ZT: thermoelectric figure of merit; S: Seebeck coefficient; σ: electrical conductivity; κ: thermal conductivity.

In 1992, Jet Propulsion Laboratory of US proposed the concept of using a skutterudite compound as a thermoelectric material having a basic chemical formula of $MX_3$ where M=Ni, Co, Fe, Rh, Ir and X=P, As, Sb. Its structure contains vacancies and the thermoelectric figure of merit is significantly improved after the vacancies are filled with metal atoms. The doping or substitution method is often used to change the composition of the skutterudite compound in order to optimize the thermoelectric figure of merit.

Ni(Sn$_{1-x}$, Sb$_x$)$_3$ is a thermodynamically stable ternary phase. According to previous research, Ni(Sn$_{1-x}$, Sb$_x$)$_3$ is a stable ternary phase formed from NiSb$_3$ by doping or substituting with Sn and Ni(Sn$_{1-x}$, Sb$_x$)$_3$ is a skutterudite compound and a good thermoelectric material. Therefore, a Sn—Sb—Ni alloy is also a potential material as a negative electrode of a lithium ion battery. Currently, the material used as the negative electrode of a lithium ion battery is carbon but the theoretical charge capacity of carbon is only about 372 mAh/g. Due to such a limit, a new material should be used to replace carbon in order to increase the charge capacity of the negative electrode. Theoretically, any metal capable of forming an alloy with lithium can be used as the material of a negative electrode. However, the volume variation of pure metal is relatively large during the process of forming an alloy with lithium and thus the mechanical stability of the material decreases after repeatedly charging and discharging so that the material gradually becomes powders and ineffective. If an intermetallic compound is used instead of pure metal, the volume variation can be effectively suppressed and the cycle property of the material can be improved.

Currently, the research on the negative electrode alloy material comprises two types of intermetallic compounds, one of which is active/active type and the other of which is active/inactive type. The active/active binary intermetallic compound comprises two elements that can react with lithium to form an alloy. Since the electric potentials of the two elements, such as Sn—Sb, Sn—Ag, etc., reacting with lithium are different, the unreacted element can be used as a buffer during volume variation. As for the active/inactive type, an "inactive" element (or metal) means a metal that does not react with lithium. Compared to the active/active type, the active/inactive type, such as Sn—Ni, Sn—Cu, etc., can suppress the volume variation more effectively but has a lower theoretical charge capacity. In the research of using a metal alloy as the material for a negative electrode, Sn and Sb are important because they have high theoretical charge capacity (994 and 660 mAh/g). Ni is an inactive metal to lithium ions but has ductility to buffer the volume inflation of the electrode. Therefore, the active/active alloy can make the electrode have high charge capacity and the characteristic of reacting with lithium ion at different electric potentials can slightly suppress the volume variation. On the contrary, the inactive metal almost does not react with lithium ion and has good ductility to significantly suppress the volume variation to solve the problem of low cycle stability and also to significantly increase the cycle lifetime of a metal electrode.

Fabrication of electrode materials can be divided into two types: powder and film types. The following equation shows using the carbon hot-reduction method to fabricate Sn—Sb—Ni ternary alloy powders as the material for a negative electrode of a lithium ion battery:

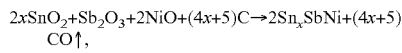

$$2x\text{SnO}_2 + \text{Sb}_2\text{O}_3 + 2\text{NiO} + (4x+5)\text{C} \rightarrow 2\text{Sn}_x\text{SbNi} + (4x+5)\text{CO}\uparrow,$$

where x=1, 2 and 3.

The above method uses 800° C. calcination to form the Sn—Sb—Ni ternary alloy and lets the alloy cool to room temperature. The Sn—Sb—Ni ternary alloy synthesized by the above method has various phases and the crystal structure of each phase is different from each other so that the arrangement of each phase in the alloy is irregular and the alloy can easily become powders during charging/discharging processes to shorten the lifetime of the battery. The conventional fabrication method is carried out based on thermodynamic theorem but the resulting alloy usually contains thermodynamic multiple phases, the processing time is long, and the production cost is high.

In conclusion, from the reports of research on the material for a negative electrode of a lithium ion battery, using Sn—Sb—Ni is a new technology. Therefore, how to fabricate a Sn—Sb—Ni ternary compound at low cost is important for the industry.

SUMMARY OF THE INVENTION

In light of the above background, in order to fulfill the industrial requirements, the invention provides a Sn—Sb—Ni ternary compound and the method for forming the same to solve the above problems in the prior art. In the following, the composition of a Sn—Sb—Ni ternary alloy is described by giving the atomic percentage of each element. For example, Sn-xSb-yNi means the elemental composition of Sb is x at %; the elemental composition of Ni is y at %; and the elemental composition of Sn is (100-x-y) at %, accordingly. Alternatively, the elemental composition of Sn:Sb:Ni in the Sn—Sb—Ni ternary alloy can be denoted by A1 at. % Sn-A2 at. % Sb-A3 at. % Ni meaning including A1 at. % of Sn, A2 at. % of Sb and A3 at. % of Ni where A1+A2+A3=100 and "at. %" denotes the atomic percentage.

One object of the present invention is to provide a Sn—Sb—Ni ternary compound and the method for forming the same. The Sn—Sb—Ni ternary compound can be applied in the areas of thermoelectric materials and the material for a negative electrode of a lithium ion battery and the Ni(Sn, Sb)$_3$ compound has a skutterudite structure. The skutterudite compound possesses a thermoelectric characteristic. The Ni(Sn$_{1-x}$, Sb$_x$)$_3$ material formed by the method according to the invention is an active/active/inactive alloy. Thus, using the Sn—Sb—Ni alloy as the negative electrode material of a lithium ion secondary battery is expected to have the advantages of combining active/active and active/inactive alloys to become an alloy for the negative electrode having high charge capacity and good cycle property.

One object of the present invention is to synthesize a skutterudite compound having a Ni(Sn$_{1-x}$, Sb$_x$)$_3$ ternary phase by a thermodynamic solid state diffusion. The skutterudite compound is a thermoelectric material to be used as an electrode and does not become powders easily during charging and discharging. In addition, the cycle lifetime of the skutterudite compound is better than that of the alloy having multiple phases. Particularly, usually the metal alloy for the negative electrode of a lithium ion battery is a binary compound. Compared to the binary compound, the ternary compound synthesized according to the invention has better performance and thus the Ni(Sn$_{1-x}$, Sb$_x$)$_3$ ternary phase is a potential material for a negative electrode of a lithium ion battery. Besides, compared to synthesis of the alloy compound according to the prior art based on thermodynamic theorem, the invention does not need an expensive sputtering or deposition equipment required for a general physical preparation method. Besides, the method according to the invention is simpler than a general chemical method and also the processing temperature is lower than the carbon hot-reduction method. Particularly, the metal film formed by the method of the invention has uniform alloy composition, uniform film composition, and uniform thickness. In conclusion, the invention can significantly increase processing efficiency and productivity to satisfy industrial requirements. Therefore, the invention does have the economic advantages for industrial applications.

In order to achieve the above objects, the invention discloses a method for forming a Sn—Sb—Ni ternary compound. The method comprises: providing a solder alloy having a Sn-xSb-yNi structure wherein x and y are atomic ratios and the range of y is 0.1~0.8; performing a joining process to join the solder alloy on a pure nickel layer and to form a couple, which is Sn-xSb-yNi/Ni; and performing a solid state diffusion process to form the Sn—Sb—Ni ternary compound from the couple. The range of x is preferably 43.5~64.5 and y is preferably 0.5. The internal phase structure of the solder alloy is a 800° C. single phase structure. The reaction temperature of the joining process is between the highest melting point of the solder alloy plus 30° C. and 60° C. A quenching process is performed, after the joining process, to lower the temperature of the couple to room temperature. The reaction temperature of the solid state diffusion process is lower than the lowest melting point of the solder alloy and higher than room temperature. The reaction temperature of the solid state diffusion process is preferably 270° C.

In order to achieve the above objects, the invention further discloses a method for forming a Sn—Sb—Ni ternary compound, comprising: forming a solder alloy having a Sn-xSb-yNi structure wherein x and y are atomic ratios and the range of y is 0.1~0.8; performing a joining process to join the solder alloy on a pure nickel layer and to form a couple, which is Sn-xSb-yNi/Ni; performing a solid state diffusion process to form a structure having a Sn—Sb—Ni ternary compound from the couple; and performing a removal process to remove the solder alloy unreacted in the structure to expose the Sn—Sb—Ni ternary compound so as to form an alloy only comprising the Sn—Sb—Ni ternary compound. The method for forming a Sn—Sb—Ni ternary compound further comprises: providing a mixture of Sn, Sb and Ni metals; performing a homogeneous melting process to melt every metal component of the mixture of Sn, Sb and Ni metals to form the solder alloy; and performing a first quenching process to cool the temperature of the solder alloy to room temperature. The reaction temperature of the homogeneous melting process is more than or equal to 800° C. The internal phase structure of the solder alloy further comprises a 800° C. single phase structure. The range of x is preferably 43.5~64.5 and y is preferably 0.5. The reaction temperature of the joining process is between the highest melting point of the solder alloy plus 30° C. and the highest melting point of the solder alloy plus 60° C., that is, between HMP+30° C. and HMP+60° C. where HMP denotes the highest melting point of the solder alloy. A second quenching process is performed after the joining process to lower the temperature of the couple to room temperature. The reaction temperature of the solid state diffusion process is lower than the lowest melting point of the solder alloy and higher than room temperature. The reaction temperature of the solid state diffusion process is preferably 270° C. A third quenching process is performed, after the joining process, to lower the temperature of the structure having a Sn—Sb—Ni ternary compound to room temperature. The structure having a Sn—Sb—Ni ternary compound further comprises a structure of $Ni(Sn_{1-x}, Sb_x)_3$ skutterudite. The "x" in $Ni(Sn_{1-x}, Sb_x)_3$ is about between 0.5~0.75.

In order to achieve the above objects, the invention further discloses a method for forming a thermoelectric material of Sn—Sb—Ni alloy having a skutterudite structure. The method comprises: forming a solder alloy having a 800° C. single phase structure wherein the structure of the solder alloy is Sn-xSb-yNi, x is an atomic ratio in the range of 43.5~64.5 and y is an atomic ratio in the range of y is 0.1~0.8; performing a joining process to join the solder alloy on a pure nickel material and to form a couple, which is Sn-xSb-yNi/Ni, wherein the reaction temperature of the joining process is between 450° C. and 550° C.; performing a solid state diffusion process to form a Sn—Sb—Ni alloy having a skutterudite structure from the couple wherein the reaction temperature of the solid state diffusion process is 270° C.; and performing a removal process to remove the solder alloy unreacted in the Sn—Sb—Ni alloy to expose the Sn—Sb—Ni alloy having the skutterudite structure so as to form the thermoelectric material; wherein the Sn—Sb—Ni alloy having the skutterudite structure is of $Ni(Sn_{1-x}, Sb_x)_3$ structure and the thermoelectric material is of $Ni(Sn_{1-x}, Sb_x)_3/Ni$ structure. The method further comprises: providing a mixture of Sn, Sb and Ni metals; performing a homogeneous melting process to melt every metal component of the mixture of Sn, Sb and Ni metals to form the solder alloy wherein the reaction temperature of the homogeneous melting process is about 800° C.; and performing a first quenching process to cool the temperature of the solder alloy to room temperature. A second quenching process is performed, after the joining process, to lower the temperature of the couple to room temperature. The "x" of $Ni(Sn_{1-x}, Sb_x)_3$ is about between 0.5~0.75. The atomic ratio of Ni to $Ni(Sn_{1-x}, Sb_x)_3$ in $Ni(Sn_{1-x}, Sb_x)_3$ is 24 at. %~26 at. %. When the solder alloy comprises Sn-43.5 at. % Sb-0.5 at. % Ni, the thermoelectric material having the skutterudite structure comprises 34.3 at. % Sn-40.7 at. % Sb-25.0 at. % Ni. When the solder alloy comprises Sn-44.5 at. % Sb-0.5 at. % Ni, the thermoelectric material having the skutterudite structure comprises 36.3 at % Sn-38.4 at % Sb-25.3 at % Ni. When the solder alloy comprises Sn-52.5 at. % Sb-0.5 at. % Ni, the thermoelectric material having the skutterudite structure comprises 23.8 at. % Sn-51.6 at. % Sb-24.6 at. % Ni. When the solder alloy comprises Sn-64.5 at. % Sb-0.5 at. % Ni, the thermoelectric material having the skutterudite structure comprises 20.3 at. % Sn-55.5 at. % Sb-24.2 at. % Ni. The Ni layer in the $Ni(Sn_{1-x}, Sb_x)_3/Ni$ structure can be used as a conductive substrate and $Ni(Sn_{1-x}, Sb_x)_3$ can be directly used as a negative electrode of a lithium ion battery or a thermoelectric material.

DESCRIPTION OF THE PREFERRED EMBODIMENTS

What is probed into the invention is a Sn—Sb—Ni ternary compound. Detail descriptions of the structure, elements and processing steps will be provided in the following in order to make the invention thoroughly understood. Obviously, the application of the invention is not confined to specific details familiar to those who are skilled in the art. On the other hand, the common structures, elements and processing steps that are known to everyone are not described in details to avoid unnecessary limits of the invention. Some preferred embodiments of the present invention will now be described in greater detail in the following. However, it should be recognized that the present invention can be practiced in a wide range of other embodiments besides those explicitly described, that is, this invention can also be applied extensively to other embodiments, and the scope of the present invention is expressly not limited except as specified in the accompanying claims.

Figure 1:
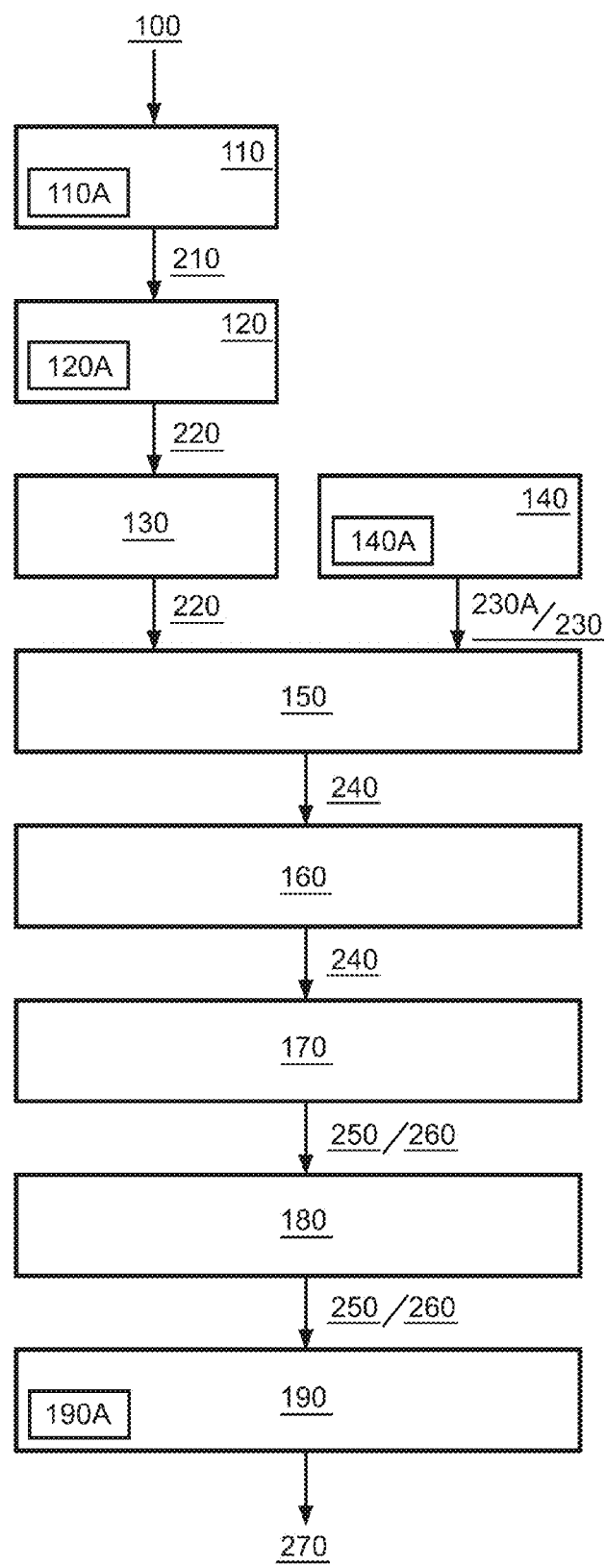
FIG. 1 shows a flow chart illustrating a method according to the present invention.

In one embodiment of the present invention, referring to FIG. 1, a method 100 for forming a Sn—Sb—Ni ternary compound is provided. At first, a material supplying process 110 is performed where a metal mixture 210 is provided and the metal mixture 210 at least comprises tin (Sn), antimony (Sb) and nickel (Ni). The material supplying process 110 includes a first deoxidation step 110A to remove oxides in the metal mixture 210. The first deoxidation step 110A can use an acid to rinse or wash the metal mixture 210 or other methods. Then, a homogeneous melting process 120 is performed to melt every metal component of the metal mixture 210 of Sn, Sb, Ni metals to form the solder alloy 220 (Sn-xSb-yNi where x and y are atomic ratios, x is preferably between 43.5~64.5 and y is preferably 0.1~0.8, more preferably 0.5). If y (the composition of Ni) is too large, some undesired structure may be produced. Besides, the reaction environment of the homogeneous melting process 120 requires under vacuum kept at the pressure less than 0.1 torr and requires the temperature more than or equal to 800° C. Argon gas should be introduced into the reaction system throughout the homogeneous melting process 120. The homogeneous melting process 120 can further include an arc fusing step 120A to fuse into the solder alloy 220 (Sn-xSb-yNi). After the homogeneous melting process 120 is carried out, a first quenching process 130 is performed to quench the solder alloy 220 (Sn-xSb-yNi) to room temperature. At the time, the internal phase structure of the solder alloy is a 800° C. single phase structure.

Figure 2A:
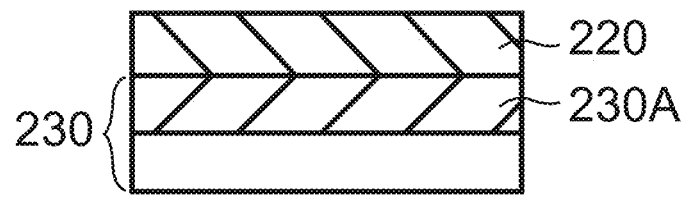
FIGS. 2A~2D show schematic diagrams illustrating the processing flow of the method according to one embodiment of the present invention.
Figure 2B:
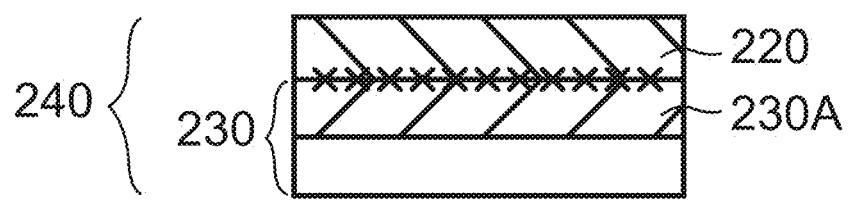

According to the embodiment, referring to FIGS. 1, 2A and 2B, a second material supplying process 140 is performed to provide a substrate 230. The second material supplying process 140 includes a second deoxidation process 140A to remove oxides on the substrate. The substrate 230 comprises at least one pure nickel layer 230A or is made of nickel. The second deoxidation process 140A can be a grinding, polishing or acid-rinsing process. Then, the solder alloy 220 (Sn-xSb-yNi) having a 800° C. single phase structure is placed on a pure nickel layer 230A and a joining process 150 is performed to form a couple 240. The couple 240 is Sn-xSb-yNi/Ni. The reaction temperature of the joining process 150 is about between the highest melting point of the solder alloy 220 (Sn-xSb-yNi) plus 30° C. and 60° C. The reaction time is about 30~120 seconds. Following that, a second quenching process 160 is performed to lower the temperature of the couple 240 to room temperature.

Figure 2C:
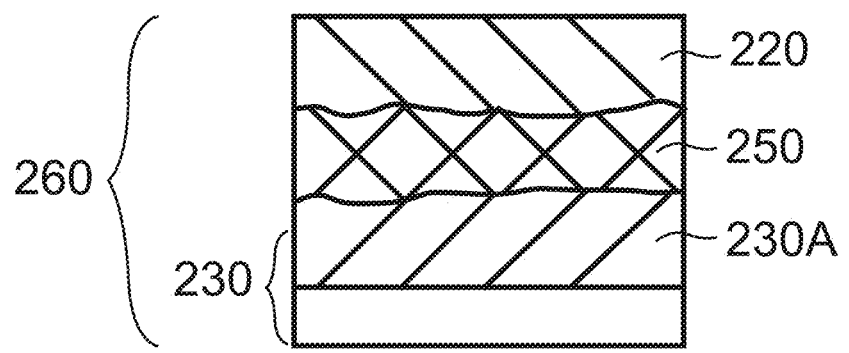
Figure 2D:
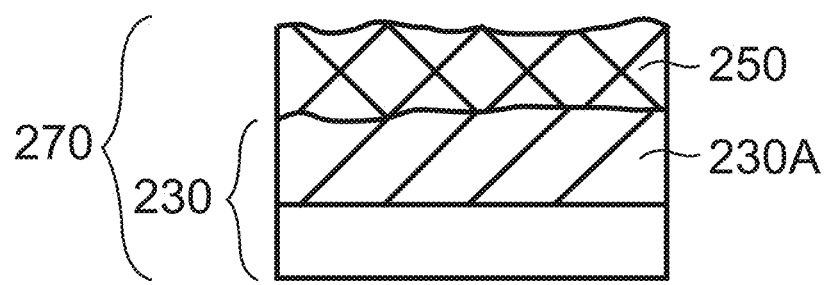

According to the embodiment, referring to FIGS. 1, 2C and 2D, a solid state diffusion process 170 is performed on the couple to form a first structure 260 having a Sn—Sb—Ni ternary alloy 250. The first structure 260 also includes an unreacted solder alloy 220 (Sn-xSb-yNi). The reaction temperature of the solid state diffusion process 170 is lower than the lowest melting point of the solder alloy 220 and higher than room temperature. The reaction time is about 12~36 hrs. The reaction temperature is preferably 270° C. The reaction time is preferably 24 hrs. The solid state diffusion process 170 uses very small amount of Ni of the solder alloy 220 (Sn-xSb-yNi) in the couple 240 to induce nickel diffusion from the nickel layer 230A of the substrate 230 to the interface to react to form the Sn—Sb—Ni ternary alloy 250. Then, a third quenching process 180 is performed to cool to room temperature. Finally, a removal process 190 is performed to remove the unreacted solder alloy 220 (Sn-xSb-yNi) to expose the Sn—Sb—Ni ternary alloy 250 to form a second structure 270 only comprising the Sn—Sb—Ni ternary alloy 250. The removal process 190 can further include an etching process 190A. The structure of the Sn—Sb—Ni ternary alloy 250 comprises a structure of $Ni(Sn_{1-x}, Sb_x)_3$ skutterudite. The second structure 270 also includes a structure of $Ni(Sn_{1-x}, Sb_x)_3$/Ni. The "x" is about 0.5~0.75. The atomic ratio of Ni to $Ni(Sn_{1-x}, Sb_x)_3$ is about 0.24~0.26.

Figure 3:
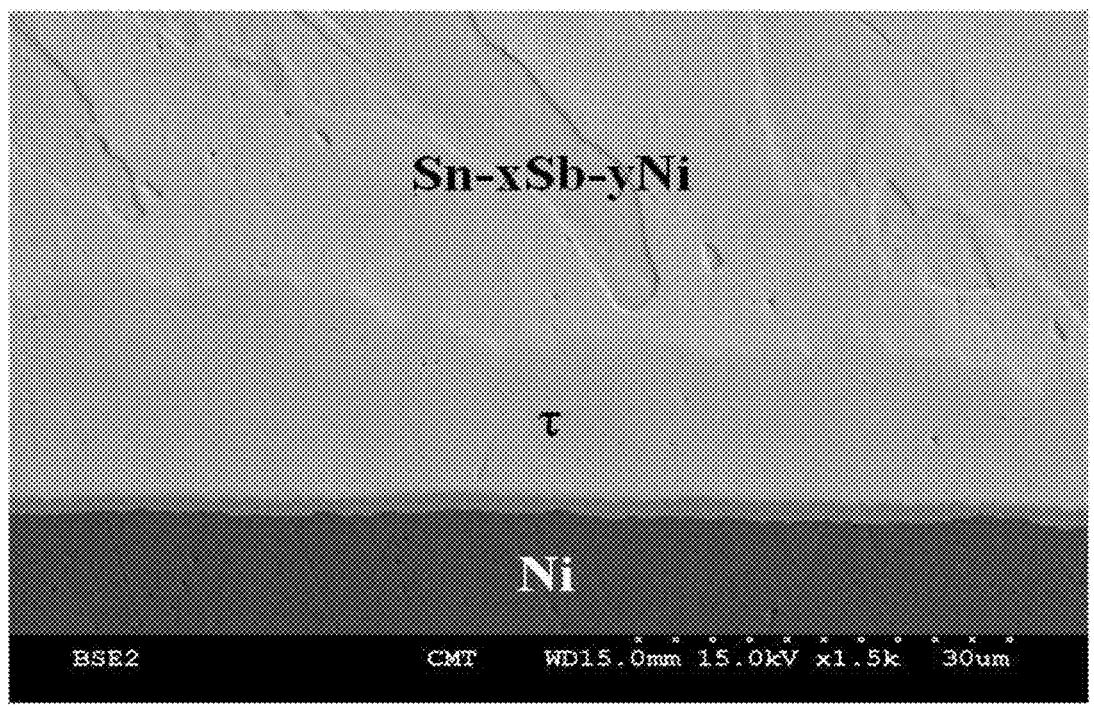
FIG. 3 shows an image diagram of the couple according to one embodiment of the present invention.
Figure 4:
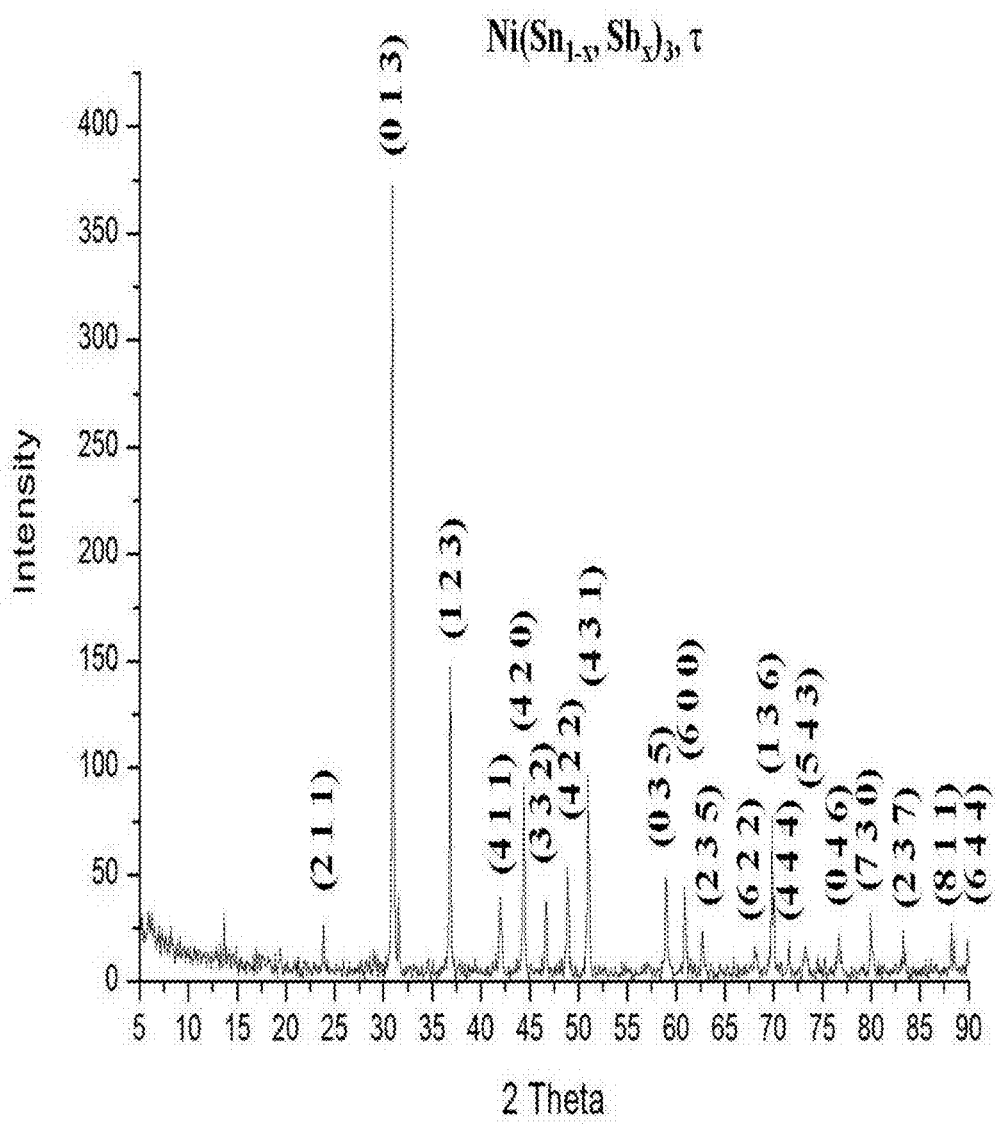
FIG. 4 shows the XRD result of $Ni(Sn_{1-x}, Sb_x)_3$ generated according to one embodiment of the present invention.
Figure 5:
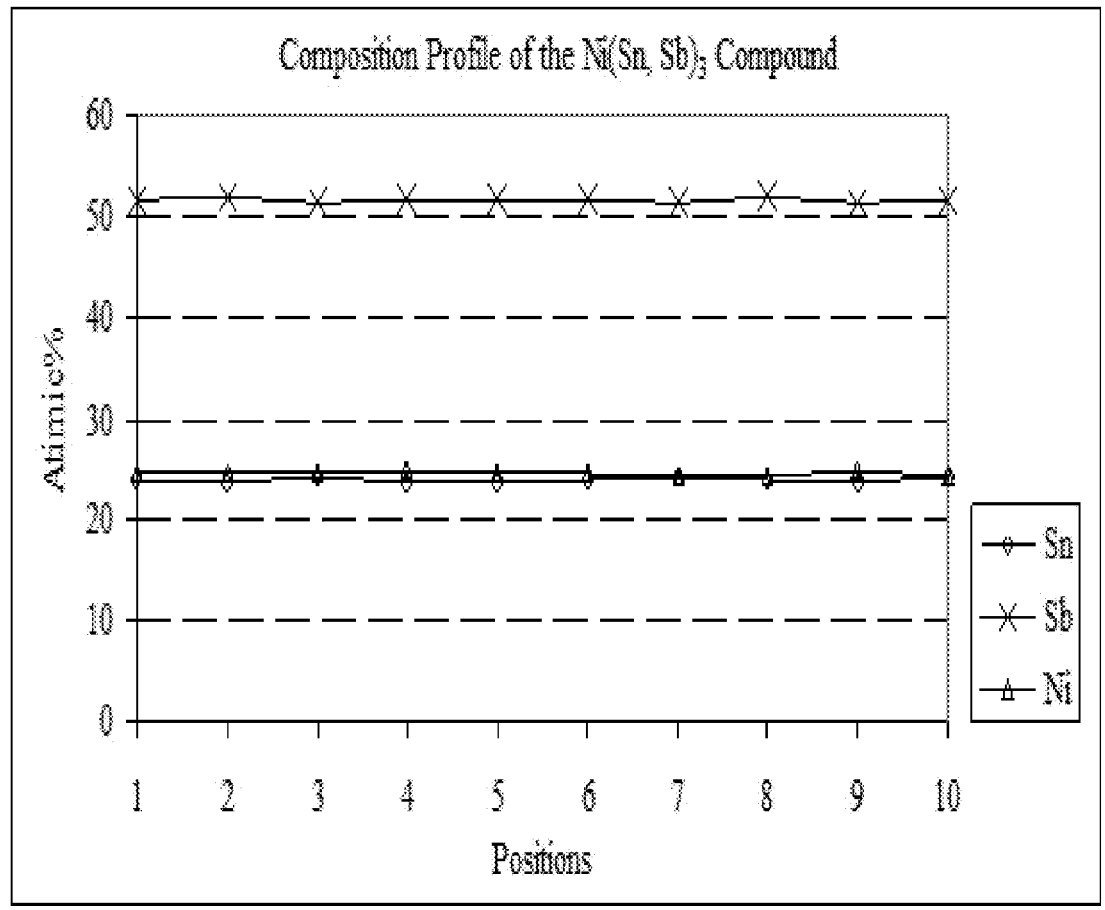
FIG. 5 shows a composition profile analysis diagram of $Ni(Sn_{1-x}, Sb_x)_3$ according to one embodiment of the present invention.

According to the embodiment of the invention, the Sn-xSb-yNi solder alloys 220 having four different ratios and the nickel substrate are used as an example to perform the joining reaction. The composition and the corresponding reflow temperature (joining temperature) are shown in table 1. The couple 240 after joining is used to perform the solid state diffusion process at 270° C. A ternary alloy can be formed at the interface within a very short time. The thermodynamic phase structure is $Ni(Sn_{1-x}, Sb_x)_3$/Ni where x is shown in table 1. The Ni layer of the invention is a conductive substrate and the ternary phase $Ni(Sn_{1-x}, Sb_x)_3$ can be directly utilized as a negative electrode material for a lithium ion battery or as a thermoelectric material. Compared to the method using thermodynamic theorem, the method of the invention using kinetics is simpler regardless of using powders or films and can obtain a purer single phase metal film. FIG. 3 shows the structure of the couple produced by the above method of the invention where the thickness of the ternary phase $Ni(Sn_{1-x}, Sb_x)_3$ is uniform and the state of adhering to the substrate is good. FIG. 4 shows the XRD result of the ternary phase $Ni(Sn_{1-x}, Sb_x)_3$ being a skutterudite structure. After analysis, the composition of the ternary phase $Ni(Sn_{1-x}, Sb_x)_3$ formed by each of the four couples is very uniform. When the solder alloy having Sn-52.5 at. % Sb-0.5 at. % Ni is used, the composition profile of the ternary phase $Ni(Sn_{1-x}, Sb_x)_3$ is shown in FIG. 5. The compositions of the ternary phases $Ni(Sn_{1-x}, Sb_x)_3$ formed by the four alloys are shown in table 1.

TABLE 1 solder alloy composition and conditions of the joining reaction

| Alloy composition | Melting point (° C.) | Reflow temperature | Reaction phase composition |
|---|---|---|---|
| Sn—43.5 at. % Sb—0.5 at. % Ni | 324° C.~398° C. | 450° C. | Sn—40.7 at. % Sb—25.0 at. % Ni |
| Sn—44.5 at. % Sb—0.5 at. % Ni | 324° C.~400° C. | 450° C. | Sn—38.4 at. % Sb—25.3 at. % Ni |
| Sn—52.5 at. % Sb—0.5 at. % Ni | 370° C.~440° C. | 490° C. | Sn—51.6 at. % Sb—24.6 at. % Ni |
| Sn—64.5 at. % Sb—0.5 at. % Ni | 425° C.~498° C. | 550° C. | Sn—55.5 at. % Sb—24.2 at. % Ni |

As shown in table 1, the skutterudite composition produced by the first set of the solder alloy according to the invention is 34.3 at. % Sn-40.7 at. % Sb-25.0 at. % Ni. Thus, x of the $Ni(Sn_{1-x}, Sb_x)_3$ skutterudite structure is about 0.54. The skutterudite composition produced by the second set of the solder alloy according to the invention is 36.3 at % Sn-38.4 at % Sb-25.3 at % Ni. Thus, x of the $Ni(Sn_{1-x}, Sb_x)_3$ skutterudite structure is about 0.51. The skutterudite composition produced by the third set of the solder alloy according to the invention is 23.8 at. % Sn-51.6 at. % Sb-24.6 at. % Ni. Thus, x of the $Ni(Sn_{1-x}, Sb_x)_3$ skutterudite structure is about 0.68. The skutterudite composition produced by the fourth set of the solder alloy according to the invention is 20.3 at. % Sn-55.5 at. % Sb-24.2 at. % Ni. Thus, x of the $Ni(Sn_{1-x}, Sb_x)_3$ skutterudite structure is about 0.73. The atomic ratio of Ni to all the alloy compositions is about 0.5 at. %.

Currently, a few methods for synthesizing a thin film electrode can only synthesize a binary compound, such as $Ni_3Sn_4$ or $Cu_6Sn_5$. However, the method according to the invention can simply and quickly synthesize a ternary compound as a negative electrode material for a lithium battery as mentioned previously. The characteristic of a ternary alloy is better than that of a binary alloy. Thus, the invention clearly is valuable commercially. Besides, the method of the invention using kinetics can form not only a ternary alloy having a skutterudite structure but also a thermoelectric material. The invention can achieve the result that cannot be accomplished by the prior technology and thus is valuable. Obviously many modifications and variations are possible in light of the above teachings. It is therefore to be understood that within the scope of the appended claims the present invention can be practiced otherwise than as specifically described herein. Although specific embodiments have been illustrated and described herein, it is obvious to those skilled in the art that many modifications of the present invention may be made without departing from what is intended to be limited solely by the appended claims.

What is claimed is:
1. A method for forming a Sn—Sb—Ni ternary compound, comprising:
providing a solder alloy having a Sn-xSb-yNi composition wherein x is an atomic percentage of Sb, which ranges from 43.5 to 64.5, y is an atomic percentage of Ni, which is 0.5, and the balance is Sn;
performing a joining process to join the solder alloy on a pure nickel layer and to form a couple, which is Sn-xSb-yNi/Ni; and performing a solid state diffusion process on the couple to form the Sn—Sb—Ni ternary compound.

2. The method according to claim 1, wherein the internal phase structure of the solder alloy is a single phase structure at 800° C.

3. The method according to claim 1, wherein the reaction temperature of the joining process is between the highest melting point of the solder alloy plus 30° C. and the highest melting point of the solder alloy plus 60° C.

4. The method according to claim 1, wherein a quenching process is performed after the joining process to lower the temperature of the couple to room temperature.

5. The method according to claim 1, wherein the reaction temperature of the solid state diffusion process is lower than the lowest melting point of the solder alloy and higher than room temperature.

6. The method according to claim 1, wherein the reaction temperature of the solid state diffusion process is 270° C.

7. A method for forming a Sn—Sb—Ni ternary compound, comprising:
providing a mixture of Sn, Sb and Ni metals;
performing a homogeneous melting process to melt each metal of the mixture of Sn, Sb and Ni metals to form a solder alloy which has a Sn-xSb-yNi composition, wherein x is an atomic percentage of Sb, which ranges from 43.5 to 64.5, and y is an atomic percentage of Ni, which is 0.5, and the balance is Sn;
performing a first quenching process to quench the solder alloy to room temperature;
performing a joining process to join the solder alloy on a pure nickel layer and to form a couple, which is Sn-xSb-yNi/Ni;
performing a solid state diffusion process on the couple to form a structure having a Sn—Sb—Ni ternary compound; and
performing a removal process to remove the solder alloy unreacted in the structure to expose the Sn—Sb—Ni ternary compound so as to form an alloy only comprising the Sn—Sb—Ni ternary compound.

8. The method according to claim 7, wherein the reaction temperature of the homogeneous melting process is more than or equal to 800° C.

9. The method according to claim 7, wherein the internal phase structure of the solder alloy further comprises a single phase structure at 800° C.

10. The method according to claim 7, wherein the reaction temperature of the joining process is between the highest melting point of the solder alloy plus 30° C. and the highest melting point of the solder alloy plus 60° C.

11. The method according to claim 7, wherein a second quenching process is performed after the joining process to lower the temperature of the couple to room temperature.

12. The method according to claim 7, wherein the reaction temperature of the solid state diffusion process is lower than the lowest melting point of the solder alloy and higher than room temperature.

13. The method according to claim 12, wherein the reaction temperature of the solid state diffusion process is 270° C.

14. The method according to claim 11, wherein a third quenching process is performed after the joining process to lower the temperature of the structure having a Sn—Sb—Ni ternary compound to room temperature.

15. A method for forming a thermoelectric material of Sn—Sb—Ni alloy having a skutterudite structure, the method comprising:
forming a solder alloy having a single phase structure at 800° C., wherein the solder alloy has a Sn-xSb-yNi composition, wherein x is an atomic percentage of Sb, which ranges from 43.5 to 64.5, y is an atomic percentage of Ni, which is 0.5, and the balance is Sn;
performing a joining process to join the solder alloy on a pure nickel material and to form a couple, which is Sn-xSb-yNi/Ni, wherein the reaction temperature of the joining process is between 450° C. and 550° C.;
performing a solid state diffusion process on the couple to form a Sn—Sb—Ni alloy having a skutterudite structure wherein the reaction temperature of the solid state diffusion process is 270° C.; and
performing a removal process to remove the solder alloy unreacted in the Sn—Sb—Ni alloy to expose the Sn—Sb—Ni alloy having the skutterudite structure so as to form the thermoelectric material;
wherein the Sn—Sb—Ni alloy having the skutterudite structure has a composition selected from one of the group consisting of the following:
34.3 at. % Sn-40.7 at. % Sb-25.0 at. % Ni, 36.3 at. % Sn-38.4 at. % Sb-25.3 at. % Ni, 23.8 at. % Sn-51.6 at. % Sb-24.6 at. % Ni and 20.3 at. % Sn-55.5 at. % Sb-24.2 at. % Ni.

16. The method according to claim 15, further comprising:
providing a mixture of Sn, Sb and Ni metals;
performing a homogeneous melting process to melt each metal of the mixture of Sn, Sb and Ni metals to form the solder alloy wherein the reaction temperature of the homogeneous melting process is about 800° C.; and
performing a first quenching process to quench the solder alloy to room temperature.

17. The method according to claim 16, wherein a second quenching process is performed, after the joining process, to lower the temperature of the couple to room temperature.

18. The method according to claim 15, wherein the Sn—Sb—Ni alloy having the skutterudite structure has the composition consisting of 34.3 at. % Sn-40.7 at. % Sb-25.0 at. % Ni is formed from the solder alloy having the composition of Sn-43.5 at. % Sb-0.5 at. % Ni.

19. The method according to claim 15, wherein the Sn—Sb—Ni alloy having the skutterudite structure has the composition consisting of 36.3 at. % Sn-38.4 at. % Sb-25.3 at. % Ni is formed from the solder alloy having the composition of Sn-44.5 at. % Sb-0.5 at. % Ni.

20. The method according to claim 15, wherein the Sn—Sb—Ni alloy having the skutterudite structure has the composition consisting of 23.8 at. % Sn-51.6 at. % Sb-24.6 at. % Ni is formed from the solder alloy having the composition of Sn-52.5 at. % Sb-0.5 at. % Ni.

21. The method according to claim 15, wherein the Sn—Sb—Ni alloy having the skutterudite structure has the composition consisting of 20.3 at. % Sn-55.5 at. % Sb-24.2 at. % Ni is formed from the solder alloy having the composition of Sn-64.5 at. % Sb-0.5 at. % Ni.

22. The method according to claim 15, wherein the Ni layer in the Sn—Sb—Ni alloy having the skutterudite structure is used as a conductive substrate and the Sn—Sb—Ni alloy having the skutterudite structure is directly used as a negative electrode of a lithium ion battery or as a thermoelectric material.

* * * * *